US012058074B2

(12) United States Patent
Lin

(10) Patent No.: US 12,058,074 B2
(45) Date of Patent: Aug. 6, 2024

(54) DATA TRANSMISSION METHOD AND DEVICE

(71) Applicant: GUANGDONG OPPO MOBILE TELECOMMUNICATIONS CORP., LTD., Dongguan (CN)

(72) Inventor: Huei-Ming Lin, Victoria (AU)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 355 days.

(21) Appl. No.: 17/516,562

(22) Filed: Nov. 1, 2021

(65) Prior Publication Data

US 2022/0052822 A1 Feb. 17, 2022

Related U.S. Application Data

(63) Continuation of application No. PCT/CN2020/079765, filed on Mar. 17, 2020.

(60) Provisional application No. 62/842,236, filed on May 2, 2019.

(51) Int. Cl.
*H04L 5/00* (2006.01)
*H04W 72/12* (2023.01)
*H04W 72/20* (2023.01)

(52) U.S. Cl.
CPC ........... *H04L 5/0053* (2013.01); *H04W 72/20* (2023.01)

(58) Field of Classification Search
CPC ... H04L 5/0044; H04L 5/0094; H04L 5/0053; H04L 5/0051; H04W 72/20
See application file for complete search history.

(56) References Cited

U.S. PATENT DOCUMENTS

| 6,215,999 | B1 | 4/2001 | Dorenbosch | |
|---|---|---|---|---|
| 2017/0054540 | A1 | 2/2017 | Kim | |
| 2019/0052436 | A1 | 2/2019 | Desai et al. | |
| 2021/0235420 | A1* | 7/2021 | Kim | H04L 1/1812 |
| 2021/0250118 | A1* | 8/2021 | Roth-Mandutz | H04W 72/56 |
| 2022/0132516 | A1* | 4/2022 | Hwang | H04W 72/563 |
| 2022/0198429 | A1* | 6/2022 | Yang | G06Q 20/327 |

(Continued)

FOREIGN PATENT DOCUMENTS

| CN | 106304351 A | 1/2017 |
|---|---|---|
| CN | 108353396 A | 7/2018 |
| CN | 110505703 A | 11/2019 |

(Continued)

OTHER PUBLICATIONS

Extended European Search Report issued in corresponding European Application No. 20798435.2, mailed May 4, 2022.

(Continued)

*Primary Examiner* — Brian D Nguyen
(74) *Attorney, Agent, or Firm* — BAYES PLLC

(57) ABSTRACT

Embodiments of the present disclosure provide a data transmission method and a terminal. The method includes mapping, by the terminal, a first-stage sidelink control information (SCI) onto a physical sidelink control channel (PSCCH); and transmitting, by the terminal, the PSCCH and associated physical sidelink shared channel (PSSCH). The first-stage SCI includes an indication information of a second-stage SCI for the associated PSSCH transmission that is mapped onto the associated PSSCH.

12 Claims, 8 Drawing Sheets

(56) References Cited

U.S. PATENT DOCUMENTS

2022/0201617 A1* 6/2022 Baek .............. H04W 52/24
2022/0248375 A1* 8/2022 Baek .............. H04W 72/56

FOREIGN PATENT DOCUMENTS

| WO | 2017026477 | A1 | 2/2017 |
|----|------------|----|----|
| WO | 2017077976 | A1 | 5/2017 |
| WO | 2017130592 | A1 | 8/2017 |
| WO | 2020033704 | A1 | 2/2020 |

OTHER PUBLICATIONS

"On sidelink physical layer structure", R1-1904492, Source: MediaTek Inc., 3GPP TSG RAN WG1 #96bis, Xi'an, China, Apr. 8-12, 2019.

"Link level evaluations of NR PSSCH", R1-1901228, Source: Ericsson, 3GPP TSG-RAN WG1 Meeting# ah-1901, Taipei, Taiwan, Jan. 21-25, 2019.

First Office Action issued in corresponding European Application No. 20798435.2, mailed Jan. 23, 2023.

Huawei et al., "Sidelink physical layer structure for NR V2X", R1-1903943, 3GPP TSG RAN WG1 Meeting #96bis Xi'an, China, Apr. 8-12, 2019.

Qualcomm Incorporated, "Considerations on Physical Layer aspects of NR V2X", R1-1905711, 3GPP TSG RAN WG1 Meeting #96bis Xian, China, Apr. 8-Apr. 12, 2019.

First Office Action issued in corresponding Chinese Application No. 202210878951.3, mailed Jun. 29, 2023.

Request for CNIPA Patent Priority Review issued in corresponding Chinese Application No. 202210878951.3, mailed Jun. 28, 2023.

Notice of Allowance issued in corresponding European Application No. 20798435.2, mailed Aug. 21, 2023.

International Search Report issued in corresponding International Application No. PCT/CN2020/079765, mailed Jun. 15, 2020, 29 pages.

PCT Written Opinion of the International Searching Authority issued in corresponding International Application No. PCT/CN2020/079765, mailed Jun. 15, 2020, 5 pages.

"Discussion on physical layer structure for sidelink in NR V2X", Agenda: 7.2.4.1, Source: Panasonic, 3GPP TSG RAN WG1 #97, R1-1906402, Reno, USA, May 13-17, 2019, 6 pages.

"Sidelink physical structure for NR V2X communication", Agenda item: 7.2.4.1, Source: Intel Corporation, 3GPP TSG RAN WG1 Meeting #99, R1-1913255, Reno, Nevada, USA, Nov. 18-22, 2019, 36 pages.

"On 2-stage PSCCH design", Agenda Item: 7.2.4.1.5, Source: Ericsson, 3GPP TSG-RAN WG1 Meeting #95, R1-1813648, Spokane, WA, US, Nov. 12-16, 2018, 4 pages.

"Feature lead summary#2 for 7.2.4.1 Physical layer structure for sidelink", Agenda item: 7.2.4.1, Source: Samsung, 3GPP TSG RAN WG1 #96bis Meeting, R1-1905725, Xi'an, China, Apr. 8-12, 2019, 24 pages.

"Physical layer structures in NR V2X", Agenda Item: 7.2.4.1, Source: Lenovo, Motorola Mobility, 3GPP TSG RAN 3GPP TSG RAN WG1 #96b, R1-1904575, Xi'an, China, Apr. 8-Apr. 12, 2019, 4 pages.

\* cited by examiner

DATA TRANSMISSION METHOD AND DEVICE

CROSS-REFERENCE TO RELATED APPLICATION

This application is a continuation of International Application No. PCT/CN2020/079765, filed on Mar. 17, 2020, which is a continuation of U.S. Application No. 62/842,236, filed on May 2, 2019, the entire contents of which are hereby incorporated by reference.

BACKGROUND

The present disclosure relates to the field of wireless communication technologies, and more particularly, to a data transmission method and device.

For the next generation of direct Vehicle-to-X (V2X) communication system to be based on the developed 5G (fifth generation) new radio (NR) technology, it is required for the new system to support more advanced V2X use cases and services that could not be provided by the current LTE-V2X (Long Term Evolution V2X) system. As such, the required performance targets such as communication delay latency and reliability of the direct link connection are getting higher and more stringent.

In the new NR SL communication for V2X, namely NR-V2X, the new multiplexing structure of physical sidelink control channel (PSCCH) for carrying sidelink control information (SCI) signaling and physical sidelink shared channel (PSSCH) for transporting V2X data information transport blocks (TBs) is used. since the location and size of PSCCH should be fixed in relation to its associated PSSCH within a resource pool (RP) so that it would reduce the burden of blind decoding at receiver User Equipments (UEs), the design and SL resource allocation for PSCCH should always account for the largest SCI payload size to ensure its performance even in the most extreme case (e.g. long communication distance range and heavily congested traffic with high interference). This, however, can be very wasteful of sidelink (SL) resources especially when SCI payload size is small (e.g. broadcast transmissions).

The above information disclosed in this Background section is only for enhancement of understanding of the background of the disclosure and therefore it may contain information that does not form the prior art that is already known in this country to a person of ordinary skill in the art.

SUMMARY

The present disclosure provides a data transmission method and device.

In a first aspect, the present disclosure provides a data transmission method, which may include mapping a first-stage sidelink control information (SCI) onto a physical sidelink control channel (PSCCH); and transmitting, by the first terminal, the PSCCH and associated physical sidelink shared channel (PSSCH); wherein the first-stage SCI includes an indication information of a second-stage SCI for the associated PSSCH transmission that is mapped onto the associated PSSCH.

In an embodiment of the present disclosure, the first-stage SCI further includes at least one of the following information: time location and/or duration of the associated PSSCH transmission; frequency location and/or size of the associated PSSCH transmission; PSSCH-DMRS pattern including location, number of symbols, or a pattern index; or size or aggregation level of the second-stage SCI.

In an embodiment of the present disclosure, the second-stage SCI includes at least one of the following information: source identifier used to identify the transmitter terminal; or hybrid automatic response request (HARQ) identifier used to identify the exact HARQ process number.

In an embodiment of the present disclosure, the second-stage SCI is mapped to resource elements (REs) on demodulation reference signal (DMRS) for PSSCH symbols.

In an embodiment of the present disclosure, the REs mapping of the second-stage SCI over the DMRS symbols is performed in frequency direction first, then time direction.

In an embodiment of the present disclosure, there are M bits in one bit field; M equals to the maximal number of CBGs supported in one PSSCH and each bit corresponds to a HARQ feedback of one CBG in the PSSCH.

In an embodiment of the present disclosure, REs on DMRS symbols not mapping the second-stage SCI are reused for mapping PSSCH data transport block (TB).

In an embodiment of the present disclosure, the first-stage SCI includes a destination ID containing a broadcast identifier, a group identifier or a unicast identifier; when the destination ID contains the broadcast identifier, this indicates the second-stage SCI is not mapped onto the associated PSSCH and when the destination ID contains the group identifier or the unicast identifier, this indicates the second-stage SCI is mapped onto the associated PSSCH.

In an embodiment of the present disclosure, more than one slots are allocated for the associated PSSCH transmission.

In an embodiment of the present disclosure, more than one PSSCH sub-channels in one slot are allocated for the associated PSSCH transmission.

In a second aspect, the present disclosure provides a data transmission method, which may include receiving a first-stage SCI transmitted on a PSCCH; determining that a second-stage SCI transmitted on associated PSSCH is based on an indication information contained in the first-stage SCI; wherein the second-stage SCI is used for the associated PSSCH reception.

In an embodiment of the present disclosure, the first-stage SCI further includes at least one of the following information: time location and/or duration of the associated PSSCH transmission; frequency location and/or size of the associated PSSCH transmission; PSSCH-DMRS pattern including location, number of symbols, or a pattern index; or size or aggregation level of the second-stage SCI.

In an embodiment of the present disclosure, the second-stage SCI includes at least one of the following information: source identifier used to identify the transmitter terminal; or hybrid automatic response request (HARQ) identifier used to identify the exact HARQ process number.

In an embodiment of the present disclosure, the second-stage SCI is mapped to resource elements (REs) on demodulation reference signal (DMRS) for PSSCH symbols.

In an embodiment of the present disclosure, the REs mapping of the second-stage SCI over the DMRS symbols is performed in frequency direction first, then time direction.

In an embodiment of the present disclosure, there are M bits in one bit field; M equals to the maximal number of CBGs supported in one PSSCH and each bit corresponds to a HARQ feedback of one CBG in the PSSCH.

In an embodiment of the present disclosure, REs on DMRS symbols not mapping the second-stage SCI are reused for mapping PSSCH data transport block (TB).

In an embodiment of the present disclosure, the first-stage SCI includes a destination ID containing a broadcast identifier, a group identifier or a unicast identifier; when the destination ID contains the broadcast identifier, this indicates the second-stage SCI is not mapped onto the associated PSSCH and when the destination ID contains the group identifier or the unicast identifier, this indicates the second-stage SCI is mapped onto the associated PSSCH.

In an embodiment of the present disclosure, more than one slots are allocated for the associated PSSCH transmission.

In an embodiment of the present disclosure, more than one PSSCH sub-channels in one slot are allocated for the associated PSSCH transmission.

In a third aspect, the present disclosure provides a terminal, which may include a mapping unit and a transmitting unit, wherein, the mapping unit is configured to map a first-stage SCI on a PSCCH; the transmitting unit is configured to transmit the PSCCH and associated PSSCH; the first-stage SCI includes an indication information of a second-stage SCI for the associated PSSCH transmission that is mapped onto the associated PSSCH.

In a fourth aspect, the present disclosure provides a terminal, which may include a receiving unit and a determining unit, wherein, the receiving unit is configured to receive a first-stage SCI transmitted on a PSCCH; the determining unit is configured to determine that a second-stage SCI transmitted on associated PSSCH is based on an indication information contained in the first-stage SCI; the second-stage SCI is used for the associated PSSCH reception.

In a fifth aspect, the present disclosure provides a terminal device for performing the method in the above first aspect or any of the possible implementations of the first aspect. In particular, the terminal device includes functional modules for performing the method in the above first aspect or any of the possible implementations of the first aspect.

In a sixth aspect, the present disclosure provides a terminal device, including a processor and a memory; wherein the memory is configured to store instructions executable by the processor and the processor is configured to perform the method in the above first aspect or any of the possible implementations of the first aspect.

In a seventh aspect, the present disclosure provides a computer readable medium for storing computer programs, which include instructions for executing the above first aspect or any possible implementation of the first aspect.

In an eighth aspect, the present disclosure provides a computer program product including a non-transitory computer-readable storage medium storing a computer program, wherein the computer program is executable to cause a computer to perform the method in the above first aspect or any possible implementation of the first aspect.

In a ninth aspect, the present disclosure provides a computer program product including a non-transitory computer-readable storage medium storing a computer program, wherein the computer program is executable to cause a computer to perform the method in the above second aspect or any possible implementation of the second aspect.

In a tenth aspect, the present disclosure provides a terminal device for performing the method in the above second aspect or any of the possible implementations of the second aspect. In particular, the terminal device includes functional modules for performing the method in the above second aspect or any of the possible implementations of the second aspect.

In a eleventh aspect, the present disclosure provides a terminal device, including a processor and a memory; wherein the memory is configured to store instructions executable by the processor and the processor is configured to perform the method in the above second aspect or any of the possible implementations of the second aspect.

In a twelfth aspect, the present disclosure provides a computer readable medium for storing computer programs, which include instructions for executing the above second aspect or any possible implementation of the second aspect.

According to the data transmission method of the embodiment of the disclosure, two-stage control signaling is used to resolve the above-mentioned problem of large variation of sidelink control information payload size between different transmission types as it is able to adapt the total amount of radio resources that is sufficient and required to carry SCI without being wasteful of precious SL resources. In addition, it can save a receiving terminal processing power and battery consumption by decoding only necessary SCI if the transmitted data information is not intended for the receiving terminal. It also can improving channel estimation and thus the decoding reliability of SCI and performance.

This section provides a summary of various implementations or examples of the technology described in the disclosure, however, it is not a comprehensive disclosure of the full scope or all features of the disclosed technology.

BRIEF DESCRIPTION OF THE DRAWINGS

To describe the technical solutions in the embodiments of the present disclosure more clearly, the following will briefly introduce the accompanying drawings required for describing the embodiments of the present disclosure. Apparently, the accompanying drawings in the following description show merely some embodiments of the present disclosure, and a person of ordinary skill in the art may still derive other drawings from these accompanying drawings without creative efforts.

DETAILED DESCRIPTION

Figure 1:
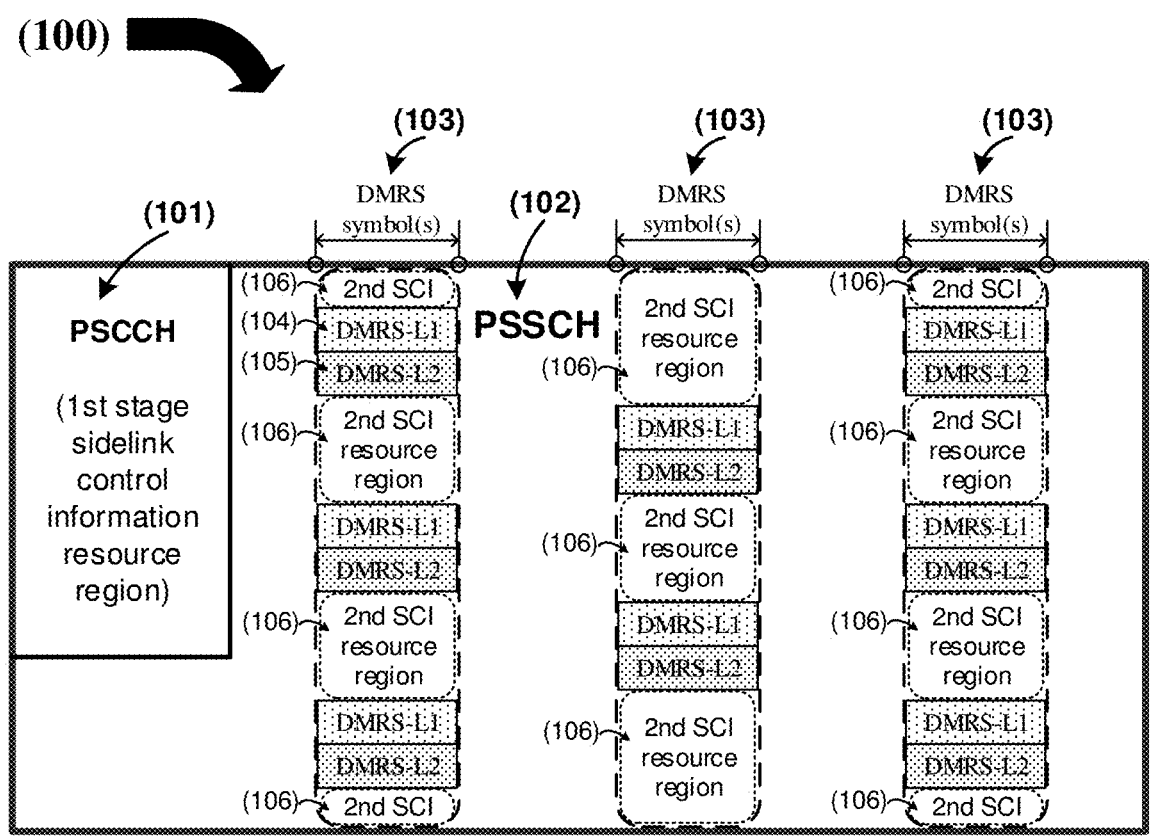
FIG. 1 illustrates an exemplary structure of the proposed multi-stage control signaling for NR sidelink communication.

Exemplary embodiments of the disclosure will now be described more fully with reference to the accompanying drawings, in which exemplary embodiments are shown. Exemplary embodiments of the disclosure may, however, be embodied in many different forms and should not be construed as being limited to the embodiments set forth herein; rather, these embodiments are provided so that this disclosure will be thorough and complete, and will fully convey the concept of exemplary embodiments to those skilled in the art. In the drawings, the thicknesses of layers and regions are exaggerated for clarity. Like reference numerals in the drawings denote like elements, and thus their description will be omitted.

The described features, structures, or/and characteristics of the disclosure may be combined in any suitable manner in one or more embodiments. In the following description, numerous specific details are disclosed to provide a thorough understanding of embodiments of the disclosure. One skilled in the relevant art will recognize, however, that the disclosure may be practiced without one or more of the specific details, or with other methods, components and so forth. In other instances, well-known structures, materials, or operations are not shown or described in detail to avoid obscuring aspects of the disclosure.

In the present disclosure, terms such as "connected" and the like should be understood broadly, and may be directly connected or indirectly connected through an intermediate medium, unless otherwise specified. The specific meanings of the above terms in the present disclosure can be understood by those skilled in the art on a case-by-case basis.

Further, in the description of the present disclosure, the meaning of "a plurality", "multiple" or "several" is at least two, for example, two, three, etc., unless specifically defined otherwise. "And/or", describing the association relationship of the associated objects, indicates that there may be three relationships, such as A and/or B, which may indicate that there are three cases of single A, single B and both A and B. The symbol "/" generally indicates that the contextual object is an "or" relationship. The terms "first" and "second" are used for descriptive purposes only and are not to be construed as indicating or implying a relative importance or implicitly indicating the number of technical features indicated. Thus, features defining "first" and "second" may include one or more of the features either explicitly or implicitly.

For the ever-evolving direct wireless communication technology to support more sophisticated V2X use cases as part of global ITS advancement, the required performance targets such as communication delay latency and reliability of the direct link connection are getting higher and more stringent. In order to meeting these requirement targets and still be able to support the new advanced V2X use cases, 3rd generation partnership project (3GPP) is currently developing a new direct SL wireless communication technology based on a recently completed first version of 5th generation new radio (5G-NR) mobile cellular system.

In NR-V2X, due to the new multiplexing structure of PSCCH and PSSCH, it is not possible to provide additional protection and better signal coverage for PSCCH transmissions by traditionally boosting its power without incurring and setting aside one symbol between the end of PSCCH and the beginning of PSSCH transmissions for the purpose of automatic gain control (AGC).

In addition, as mentioned above, since the location and size of PSCCH should be fixed in relation to its associated PSSCH within a resource pool (RP) so that it would reduce the burden of blind decoding at receiver UEs, the design and SL resource allocation for PSCCH should always account for the largest SCI payload size to ensure its performance even in the most extreme case (e.g. long communication distance range and heavily congested traffic with high interference). This, however, can be very wasteful of sidelink resources especially when SCI payload size is small (e.g. broadcast transmissions).

To resolve this problem, it has been suggested to allocation separate RPs for different transmission types, such as one RP for broadcast, one for groupcast and another one for unicast. However, this approach cannot guarantee sufficient resources are always allocated for each transmission type. Over-dimensioning itself is resource wasteful, and under-dimensioning will degrade system performance and user experience and safety. Another suggestion is to divide the total control signalling information and sending some information earlier for resource reservation and to facilitate receiver UE sensing operation. This, however, introduces an issue of decoding latency for the control signalling. Some also suggested to partition the PSCCH resource region into two, one with a fixed size and the other one with variable size. But the proposal does not increase the total available resources that can be used for sending the control signalling and at the same time adding an additional 24 CRC bits to the total payload, by which would only degrade the decoding performance.

In embodiments of the present disclosure, multi-stage control signalling for NR sidelink communication is introduced, which aims to resolve the above problem of large variation of sidelink control information payload size between different transmission types, as it is able to adapt the total amount of radio resources that is sufficient and required to carry SCI without being wasteful of precious SL resources. At the same time, the additional latency delay in decoding SCI would be at a minimal. Other benefits, which include saving UE processing power and battery consumption by decoding only necessary SCI if the transmitted data information is not intended for the receiver UE and improving channel estimation and thus the decoding reliability of SCI and performance, can be obtained.

In the present disclosure of the proposed multi-stage control signalling method for NR SL communication from a first transmitting UE to at least one receiver UE, the said first UE (UE_1) sends a first-stage SCI via a PSCCH in a 1st stage SCI resource region (101) and a second-stage SCI via a PSSCH 102 in 2nd stage SCI resource region (106), as depicted by an exemplary structure 100 shown in FIG. 1.

For the 1st stage of SCI provided by UE_1, it should provide sufficient information for the receiver UE (UE_2) to determine at least one of the followings: allowing the receiver UE (UE_2) to determine whether the current/associated PSSCH transmission is intended for UE_2, allowing the receiver UE (UE_2) to determine if a 2nd stage SCI is transmitted by UE_1 and if yes, whether there is a need to decode the 2nd stage SCI; time and frequency location, and size of the associated PSSCH transmission (102), demodulation reference signal (DMRS) pattern for PSSCH (104 and 105), size or aggregation level of the 2nd stage SCI (if transmitted by UE_1), resource element (RE) mapping location of the 2nd stage SCI (if transmitted by UE_1), and RE mapping location of the transmitted PSSCH.

In order to achieve the above functionalities, at least one of the following control parameters should be provided in the 1st stage SCI carried in PSCCH (101).

Destination ID—this parameter implicitly indicates the presence of a 2nd stage SCI for the current/associated PSSCH transmission, and whether the receiver UE (UE_2) needs to decode the 2nd stage SCI).

If this parameter contains a broadcast identifier, which is (pre-)configured and known to all receiver UEs, an 2nd stage SCI is not needed and not transmitted. The PSSCH REs that would normally be mapped and used for transmitting the 2nd stage SCI are instead be used for mapping and transmitting PSSCH carrying data transport block (TB). All receiver UEs that able to decode the 1st stage SCI and extract this this broadcast identifier, are required to receive and decode the associated PSSCH.

If groupcast or unicast identifier, which could be (pre-)configured and known to all or only a certain receiver UEs belong to the same groupcast or unicast session, an 2nd stage SCI would be mapped and transmitted in PSSCH by UE_1. If the receiver UE (UE_2) does not recognize this groupcast or unicast identifier, the said UE_2 determines the current/associated PSSCH transmission is not intended for the UE and skips decoding the 2nd stage SCI and data TB transmitted in PSSCH.

Time location and duration of the associated PSSCH transmission.

Starting symbol and/or time duration (number of symbols and/or slots) of the associated PSSCH are needed not only for data TB decoding, but they are to be also used by the receiver UE (UE_2) to determine RE mapping locations of the 2nd stage SCI. For example, if the current/associated PSSCH is transmitted over multiple slots, RE mapping of the 2nd stage SCI could span over multiple slots as well.

Frequency location and size of the associated PSSCH transmission.

Similarly, the frequency location and/or size (number of PRBs and/or sub-channels) of the associated PSSCH are need not only for data TB decoding, but they are to be also used by UE_2 to determine RE mapping location of the 2nd stage SCI spanning across multiple physical resource blocks (PRBs).

PSSCH-DMRS pattern—location, number of symbols, or a pattern index.

DMRS pattern is needed by the receiver UE (UE_2) besides performing channel estimation in order to decode PSSCH, this DMRS pattern information is also needed for UE_2 to determine RE mapping locations of the 2nd stage SCI (e.g. identify which symbols within the current slot).

Size/aggregation level of 2nd stage SCI.

Larger size or higher aggregation level of SL REs can be used to accommodate more sidelink control information/parameters. Depending on groupcast or unicast transmission, some sidelink control information/parameters may or may not be included as part of the 2nd stage SCI. E.g. when a session-less/connectionless groupcast identifier is indicated, source identifier could be omitted in the 2nd stage SCI, since it is irrelevant to the receiver UE. On the other hand, a zone identifier is only needed in session-less/connectionless groupcast communication in order for the receiver UE to determine whether to provide HARQ feedback. Another example is when HARQ feedback is disabled for either groupcast or unicast. In this case, HARQ identifier number would not need to be indicated in the 2nd stage SCI.

For the 2nd stage SCI transmitted in PSSCH, it should have at least one of the following contents.

Source identifier—this is to identify the transmitter UE (UE_1). For a receiver UE (UE_2), it may involve in a groupcast session which has more than two group member UEs in the session. This source identifier will allow UE_2 to distinguish which group member UEs the current/associated data TB is transmitted from.

Hybrid automatic response request (HARQ) identifier—this is to identify the exact HARQ process number in order for the receiver UE (UE_2) to perform HARQ combining.

RE mapping of the 2nd stage SCI in PSSCH.

In reference to the exemplary structure (100) of the multi-stage control signalling for NR sidelink communication in FIG. 1, for the RE mapping of the 2nd stage SCI, several mapping rules/principles should be followed:

It is always mapped to REs on DMRS for PSSCH symbols only (103's). The mapping can be only a subset or all of the DMRS symbols. Channel estimation performed at receiver UE has higher accuracy in the frequency domain than time domain, especially when sidelink communication technology is used for V2X applications. Due to high vehicle speeds causing highly time-selective wireless fading channel, accuracy of channel estimation in the time domain is often low. On the other hand, since the target communication range for sidelink V2X is only for surrounding UEs in proximity, frequency-selectivity of the wireless fading channel would be slow varying. As such, decoding performance of the 2nd stage SCI would be highest if it is mapped onto REs of DMRS symbols as shown by 106's.

To minimize delay latency of decoding the 2nd stage SCI, RE mapping of the 2nd stage SCI over the DMRS symbols (103's) should be performed in frequency direction first, then time direction (from low frequency and time index first).

Figure 2:
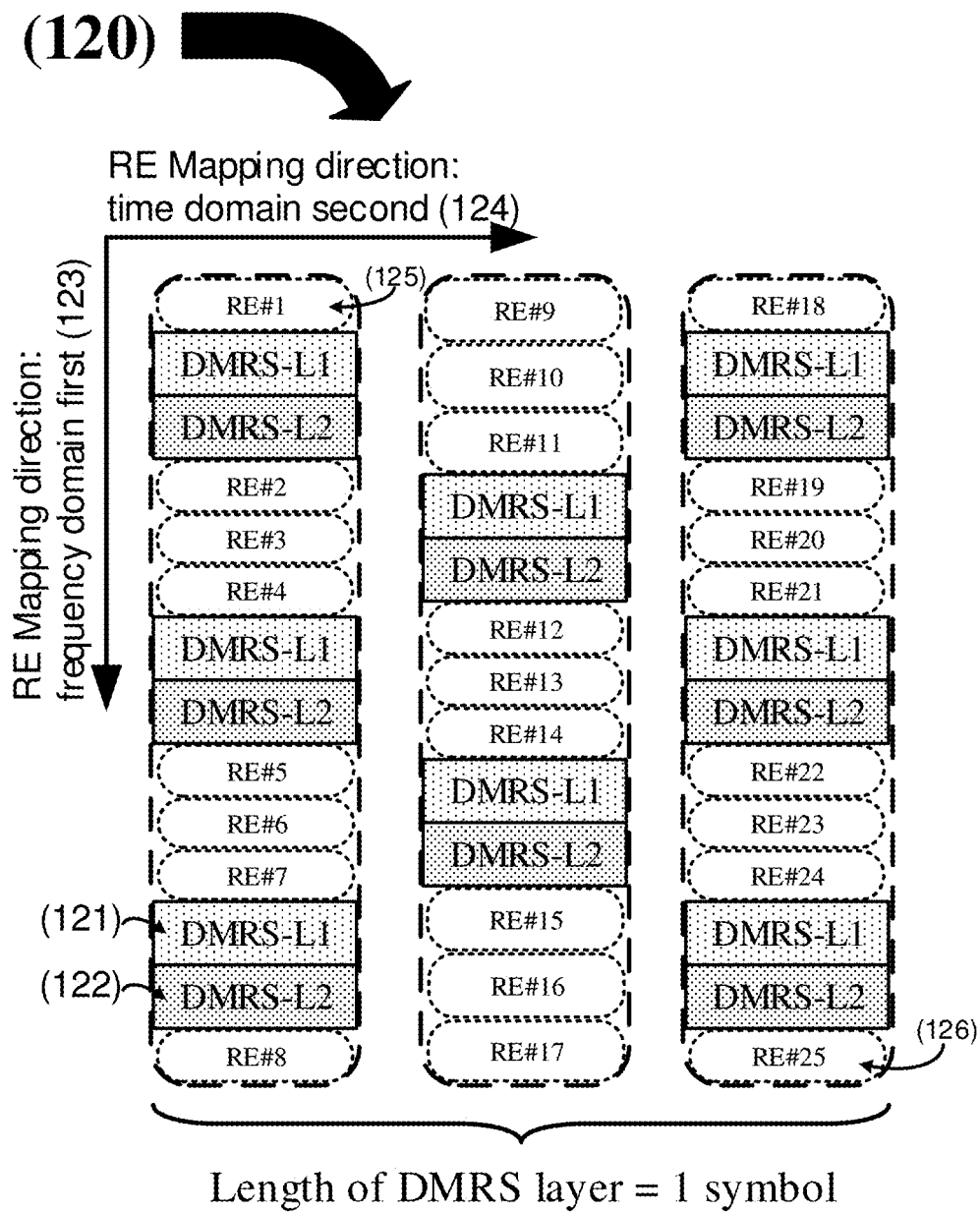
FIG. 2 illustrates an exemplary illustration of the proposed RE mapping of the second-stage SCI for the case of PSSCH DMRS symbol length per transmission layer is equal to 1.

In reference to the exemplary illustration (120) of the proposed RE mapping of the second-stage SCI in FIG. 2 for the case of PSSCH DMRS symbol length per transmission layer (121 and 122) is equal to 1, REs that are available for mapping of the 2nd stage SCI spans from 125 to 126, total of 25 REs. Following the mapping principle of frequency domain first (123) and time domain second (124), these available REs can be indexed in the order of mapping from RE #1 (125) to RE #25 (126) as shown in (120).

Figure 3:
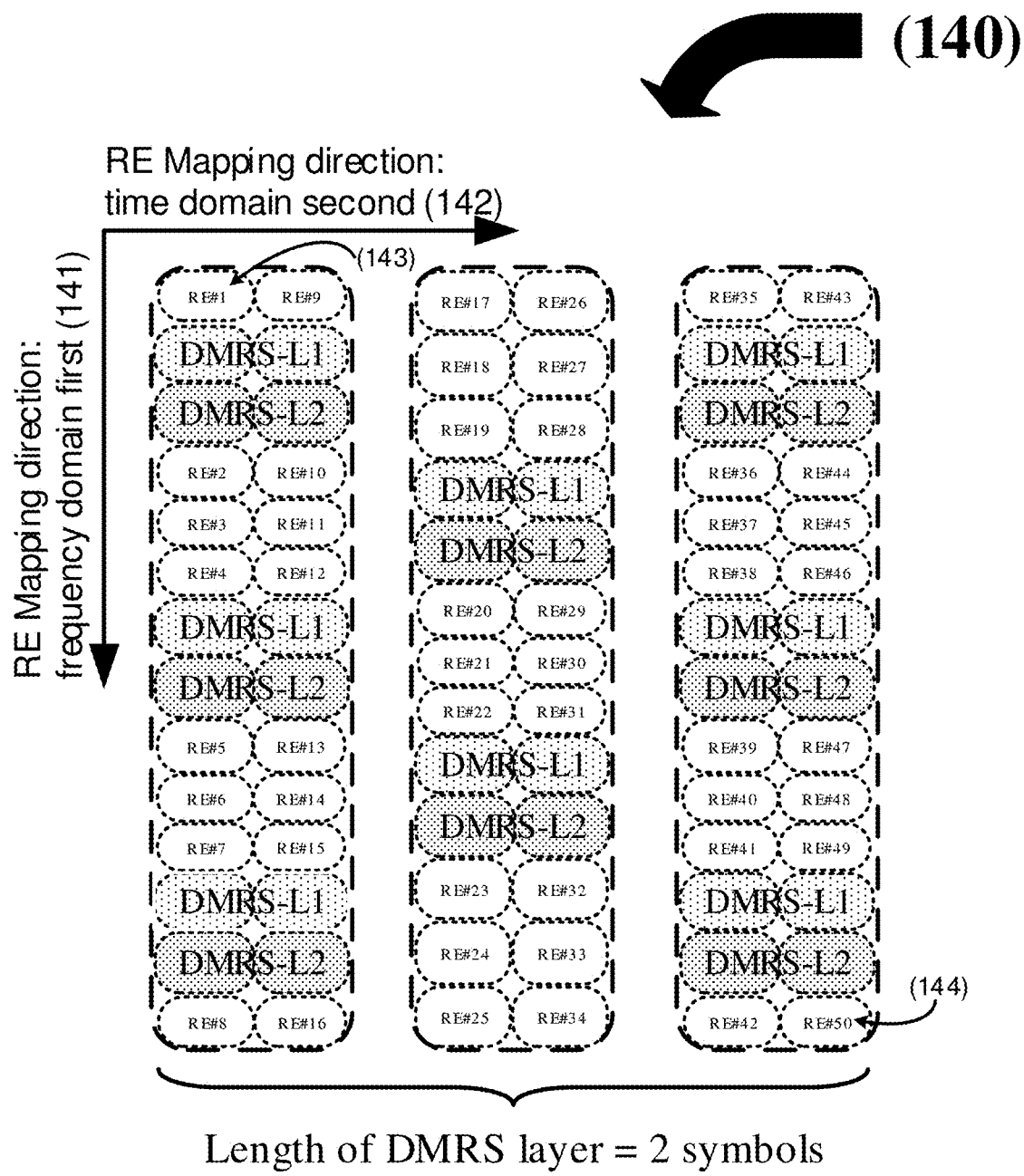
FIG. 3 illustrates an exemplary illustration of the proposed RE mapping of the second-stage SCI for the case of PSSCH DMRS symbol length per transmission layer is equal to 2.

For the case of PSSCH DMRS symbol length per transmission layer is equal to 2, the number of available REs for mapping of 2nd stage SCI would be doubled from the previous illustration case to total of 50 REs, in reference to the exemplary illustration (140) in FIG. 3. In this case, following the same mapping principle of frequency domain first (141) and then time domain second (142), the available REs for 2nd stage SCI mapping can be index from RE #1 in (143) to RE #50 in (144).

It should be noted that, by mapping the 2nd stage SCI in the frequency domain first and then time domain second, this would allow the receiver UE (UE_2) to complete decoding of the 2nd stage SCI earlier than if mapping in the time domain first and then frequency domain second.

Examples of RE mapping of the 2nd stage SCI in PSSCH.

Figure 4:
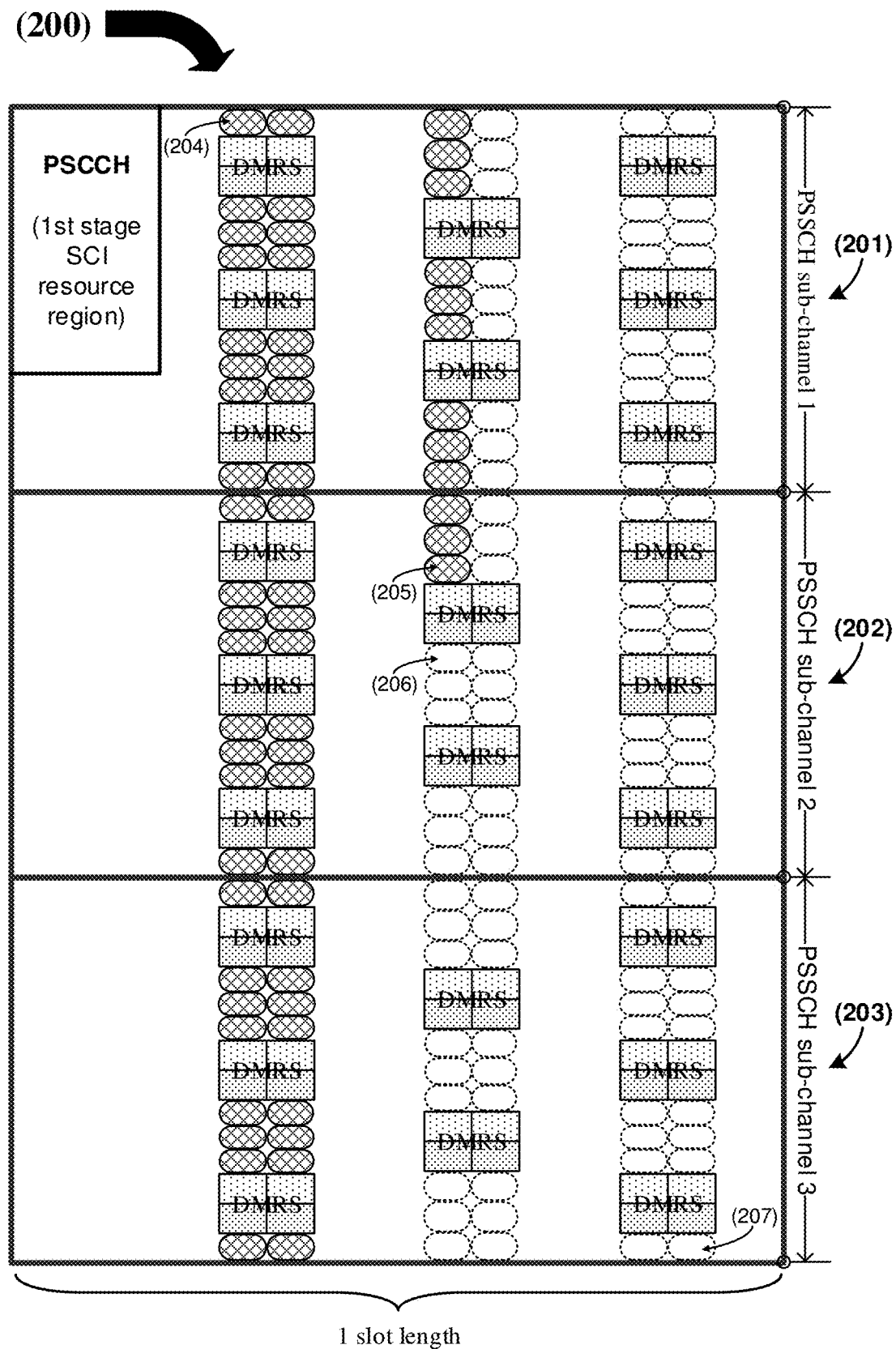
FIG. 4 illustrates an example of RE mapping for the second-stage SCI when only partial 2nd SCI resource region is needed in the case of more than one slots are allocated for PSSCH transmission.

In reference to FIG. 4, an example of RE mapping for the 2nd stage SCI is depicted in (300) when only partial 2nd SCI resource region is needed in the case of more than one slots (301, 302, 303) are allocated for PSSCH transmission. In this example, the total available REs in DMRS symbols that can be used for mapping of 2nd stage SCI span from (304)

to (307). Due to number of required REs for mapping of 2nd stage SCI is less than the total REs available, it is mapped only from (304) to (305), following the mapping principle of frequency domain first and then time domain second. In some scenarios, certain SCI control parameters may not need to be provided all the time, e.g., source identifier in the case of session-less/connectionless groupcast communication, 2nd stage SCI payload size can be reduced. And hence less the number of required REs for mapping. In this case, the remaining unused REs from (306) to (307) could be reused for mapping PSSCH data TB. As such, no SL resource is wasted and the variable payload size of 2nd stage SCI can be flexibly accommodated. And thus, this design resolves the issue of over- or under-dimensioning of PSCCH resource region that is typically associated with single-stage SCI design.

Figure 5:
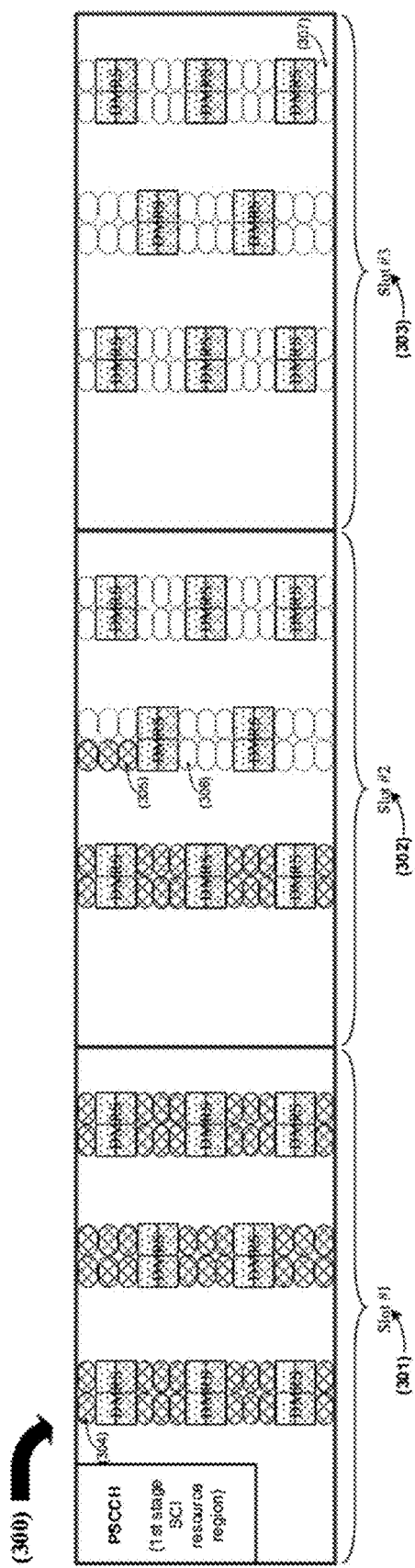
FIG. 5 illustrates an example of RE mapping for the second-stage SCI when only partial 2nd SCI resource region is needed in the case of more than one PSSCH sub-channels are allocated for PSSCH transmission.

In reference to FIG. 5, another example of RE mapping for the 2nd stage SCI is depicted in (200) when only partial 2nd SCI resource region is needed in the case of more than one PSSCH sub-channels (201, 202, 203) are allocated for PSSCH transmission. In this example, the total available REs in DMRS symbols that can be used for mapping of 2nd stage SCI span from (204) to (207). Due to number of required REs for mapping of 2nd stage SCI is less than the total REs available, it is mapped only from (204) to (205), following the mapping principle of frequency domain first and then time domain second. In some scenarios, the number of sub-channels required for carrying PSSCH transmission due to large data TB payload size could be more than usual. As such, this would create a larger 2nd SCI resource region with more available REs for mapping the 2nd stage SCI. And hence resulting in some unused REs. In this case, the remaining unused REs from (206) to (207) could be reused for mapping PSSCH data TB.

The use of two-stage control signalling method and control parameter indications in the 1st stage SCI are to resolve the issue of over- or under-dimensioning of PSCCH resource region that is typically associated with single-stage SCI design, allow receiver UE to determine whether to skip decoding the 2nd stage SCI transmitted in the PSSCH resource region and identify whether the transmitted data TB is intended for it or not without having to decode the full physical control signalling to minimize UE processing power and battery consumption, determine RE mapping positions and size of the 2nd stage SCI in the PSSCH resource region, and identify time and frequency size and location of PSSCH for decoding and resource sensing.

The proposed mapping structure and method for the 2nd stage SCI to provide best possible performance of decoding the 2nd stage SCI at the receiver by mapping REs in the same OFDM symbols as PSSCH-DMRS, minimise decoding latency of physical control signalling by RE mapping 2nd stage SCI in the frequency domain first, then time domain symbols, being flexible to adapt to variable SCI payload size without defining a fixed resource region and size for mapping the 2nd stage SCI, and provide maximum SL resource utilization without any resource wastage by mapping PSSCH in unused 2nd SCI resource region REs.

With reference to the accompanying drawings, a data transmission method and equipment provided by the embodiments of the present disclosure will be specifically described below.

It is to be understood that the technical solutions of the present disclosure may be used in various wireless communication systems, for example, Global System of Mobile communication (GSM), General Packet Radio Service (GPRS), Wideband Code Division Multiple Access (WCDMA), High-Speed Packet Access (HSPA), LTE, LTE-Advanced (LTE-A), New Radio (NR) and so on. Furthermore, the communication between a terminal and a network device in the wireless communication network may be performed according to any suitable generation communication protocols, including, but not limited to, the second generation (2G), 2.5G, 2.75G, the third generation (3G), the fourth generation (4G), 4.5G, the fifth generation (5G) communication protocols, and/or any other protocols either currently known or to be developed in the future.

It is to be understood that the term "terminal" refers to any end device that can access a wireless communication network and receive services therefrom. The terminal may include user equipment (UE), which is also referred to as a mobile terminal or mobile user equipment and so on. The user equipment may be a mobile terminal such as a mobile telephone (also referred to as a cellular telephone) or a computer having a mobile terminal such as portable, pocket, hand-held, vehicle-mounted mobile apparatuses or a mobile apparatus with a built-in computer.

It is to be understood that the term "network device" refers to a device in a wireless communication network via which a terminal accesses the network and receives services therefrom. The network device may include a base station (BS), an access point (AP), a Mobile Management Entity (MME), a Multi-cell/Multicast Coordination Entity (MCE), a Access and Mobility Management Function (AMF)/User Plane Function (UPF), a gateway, a server, a controller or any other suitable device in the wireless communication network. The BS may be, for example, a base transceiver station (BTS) in the GSM or the CDMA, or may be a Node B in the WCDMA, or may be an evolutional Node B (eNB or e-NodeB) in the LTE or the LTE-A, or may be a gNB or ng-eNB in the NR, and the present disclosure is not limited thereto.

Figure 6:
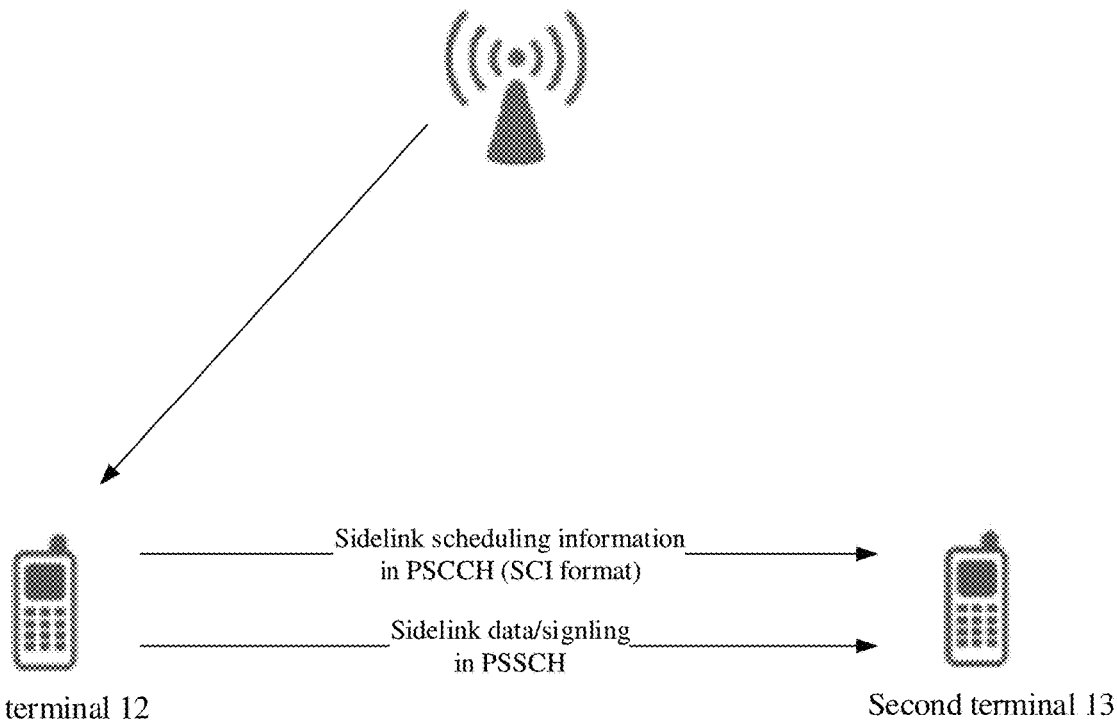
FIG. 6 schematically illustrates a data transmission system architecture according to an embodiment of the present disclosure.

FIG. 6 schematically illustrates a data transmission system architecture according to an embodiment of the present disclosure.

Referring to FIG. 6, the data transmission system 10 includes a network device 11, a first terminal 12 (which refers here to a sending terminal) and a second terminal 13 (which refers here to a receiving terminal).

Communication between the network device 11 and the first terminal 12, as well as communication between the network device 11 and the second terminal 13, is implemented through a first-type air interface (e.g. a LTE Uu or NR Uu Interface in cellular mobile communication). And communication between the first terminal 12 and the second terminal 13 is implemented through a second-type air interface (e.g. a SL air interface).

SL resource(s) for the first terminal 12 transmission can be scheduled by the network device 11. Or, the first terminal 12 can determine, i.e. the network device 11 does not schedule, SL transmission resource(s) within SL resources configured by network (e.g. the network device 11) or pre-configured SL resources.

It can be understood that in the data transmission system 10, there may be multiple first terminals and second terminals. In FIG. 5, in order to simplify the drawing, only the first terminal 12 and the second terminal 13 are exemplarily illustrated. However, it does not mean that the number of the first terminal 12 and the second terminal 13 is limited.

It should be noted that the SL data (e.g. being transmitted from the first terminal 12 to the second terminal 13 shown in FIG. 6) may include user data of the user plane, and may also include signaling or messages of the control plane.

Figure 7:
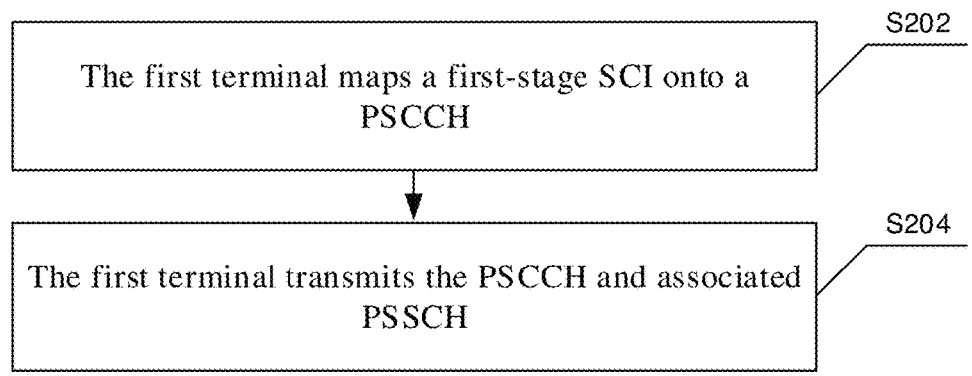
FIG. 7 schematically illustrates a flowchart of a data transmission method according to an embodiment of the present disclosure.

FIG. 7 schematically illustrates a flowchart of a data transmission method according to an embodiment of the present disclosure. The method may be applied, for example, to the first terminal 12 in FIG. 6.

Referring to FIG. 7, the method 20 includes the followings.

In Step S202, the first terminal maps a first-stage SCI onto a PSCCH. Wherein the first-stage SCI includes an indication information of a second-stage SCI for the associated PSSCH transmission that is mapped onto the associated PSSCH. A PSSCH is said to be "associated" to a PSCCH when the PSCCH carries at least the SCI necessary to decode the PSSCH.

In an embodiment of the present disclosure, as mentioned above, the first-stage SCI includes a destination ID containing a broadcast identifier, a group identifier or a unicast identifier; when the destination ID contains the broadcast identifier, this indicates the second-stage SCI is not mapped onto the associated PSSCH and when the destination ID contains the group identifier or the unicast identifier, this indicates the second-stage SCI is mapped onto the associated PSSCH.

In an embodiment of the present disclosure, as mentioned above, for the first-stage SCI, it should provide sufficient information for the second terminal to determine at least one of the followings: time location and/or duration of the associated PSSCH transmission; frequency location and/or size of the associated PSSCH transmission; PSSCH-DMRS pattern including location, number of symbols, or a pattern index; or size or aggregation level of the second-stage SCI.

In an embodiment of the present disclosure, as mentioned above, the second-stage SCI includes at least one of the following information: source identifier used to identify the transmitter terminal; or hybrid automatic response request (HARQ) identifier used to identify the exact HARQ process number.

In an embodiment of the present disclosure, as mentioned above, for the RE mapping of the second-stage SCI, it is mapped to REs on DMRS for PSSCH symbols only. The mapping can be only a subset or all of the DMRS symbols.

In an embodiment of the present disclosure, as mentioned above, to minimize delay latency of decoding the second-stage SCI, RE mapping of the second-stage SCI over the DMRS symbols should be performed in frequency direction first, then time direction (from low frequency and time index first).

In an embodiment of the present disclosure, as shown in FIG. 4 and FIG. 5, REs on DMRS symbols not mapping the second-stage SCI are reused for mapping PSSCH data transport block.

In Step 204, the first terminal transmits the PSCCH and associated PSSCH.

The first terminal transmits the PSCCH and associated PSSCH to the second terminal.

In an embodiment of the present disclosure, as shown in FIG. 4, more than one slots are allocated for the associated PSSCH transmission.

In an embodiment of the present disclosure, more than one PSSCH sub-channels in one slot are allocated for the associated PSSCH transmission.

According to the data transmission method of the embodiment of the disclosure, two-stage control signaling is used to resolve the above-mentioned problem of large variation of sidelink control information payload size between different transmission types as it is able to adapt the total amount of radio resources that is sufficient and required to carry SCI without being wasteful of precious SL resources. In addition, it can save a receiving terminal processing power and battery consumption by decoding only necessary SCI if the transmitted data information is not intended for the receiving terminal. It also can improving channel estimation and thus the decoding reliability of SCI and performance.

Figure 8:
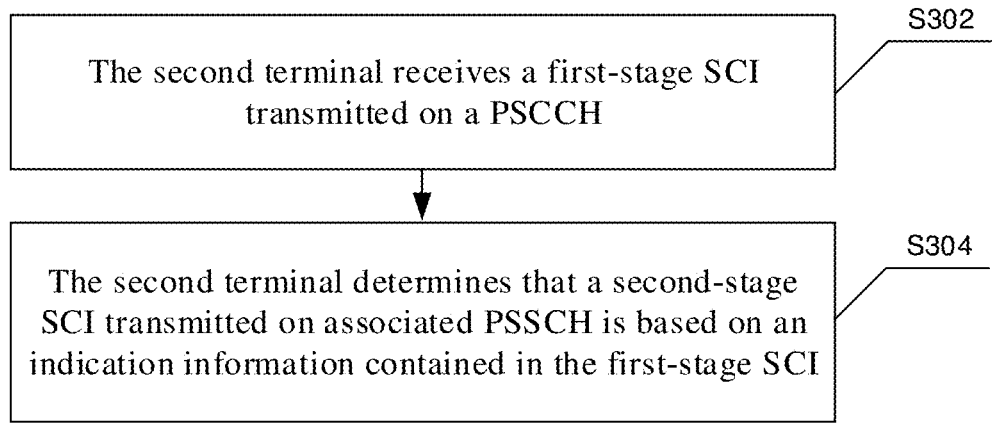
FIG. 8 schematically illustrates a flowchart of a data transmission method according to another embodiment of the present disclosure.

FIG. 8 schematically illustrates a flowchart of a data transmission method according to another embodiment of the present disclosure. The method may be applied, for example, to the second terminal 13 in FIG. 6.

Referring to FIG. 8, the method 30 includes the following.

In Step S302, the second terminal receives a first-stage SCI transmitted on a PSCCH.

The second terminal monitors configured PSCCHs for its PSCCH reception. After the second terminal receives its PSCCH, it decodes the PSCCH to obtain a first-stage SCI.

In Step S304, the second terminal determines that a second-stage SCI transmitted on associated PSSCH is based on an indication information contained in the first-stage SCI.

In an embodiment of the present disclosure, as mentioned above, the first-stage SCI includes a destination ID containing a broadcast identifier, a group identifier or a unicast identifier; when the destination ID contains the broadcast identifier, this indicates the second-stage SCI is not mapped onto the associated PSSCH and when the destination ID contains the group identifier or the unicast identifier, this indicates the second-stage SCI is mapped onto the associated PSSCH.

In an embodiment of the present disclosure, as mentioned above, for the first-stage SCI, it should provide sufficient information for the second terminal to determine at least one of the followings: time location and/or duration of the associated PSSCH transmission; frequency location and/or size of the associated PSSCH transmission; PSSCH-DMRS pattern including location, number of symbols, or a pattern index; or size or aggregation level of the second-stage SCI.

In an embodiment of the present disclosure, as mentioned above, the second-stage SCI includes at least one of the following information: source identifier used to identify the transmitter terminal; or hybrid automatic response request (HARQ) identifier used to identify the exact HARQ process number.

In an embodiment of the present disclosure, as mentioned above, for the RE mapping of the second-stage SCI, it is mapped to REs on DMRS for PSSCH symbols only. The mapping can be only a subset or all of the DMRS symbols.

In an embodiment of the present disclosure, as mentioned above, to minimize delay latency of decoding the second-stage SCI, RE mapping of the second-stage SCI over the DMRS symbols should be performed in frequency direction first, then time direction (from low frequency and time index first).

In an embodiment of the present disclosure, as shown in FIG. 4 and FIG. 5, REs on DMRS symbols not mapping the second-stage SCI are reused for mapping PSSCH data transport block.

In an embodiment of the present disclosure, as shown in FIG. 4, more than one slots are allocated for the associated PSSCH transmission.

In an embodiment of the present disclosure, more than one PSSCH sub-channels in one slot are allocated for the associated PSSCH transmission.

According to the data transmission method of the embodiment of the disclosure, two-stage control signaling is used to resolve the above-mentioned problem of large variation of sidelink control information payload size between different transmission types as it is able to adapt the total amount of radio resources that is sufficient and required to carry SCI without being wasteful of precious SL resources. In addition, it can save a receiving terminal processing power and battery consumption by decoding only necessary SCI if the transmitted data information is not intended for the receiving terminal. It also can improving channel estimation and thus the decoding reliability of SCI and performance.

The following is embodiments of the device of the present disclosure, which can be used to carry out the method embodiments of the present disclosure. For details not disclosed in the embodiment of the device of the present disclosure, please refer to the method embodiments of the present disclosure.

Figure 9:
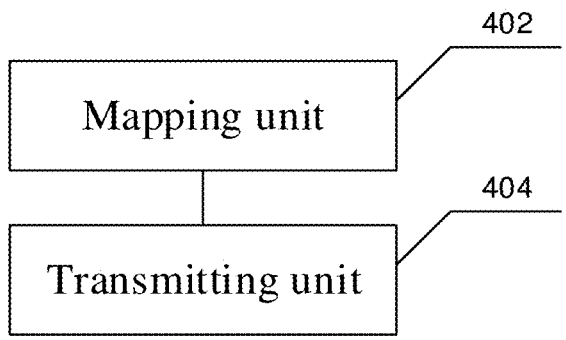
FIG. 9 schematically illustrates a terminal according to an embodiment of the present disclosure.

FIG. 9 schematically illustrates a terminal according to an embodiment of the present disclosure. The terminal may be the first terminal 12 in FIG. 6.

Referring to FIG. 9, the terminal 40 includes a mapping unit 402 and a transmitting unit 404.

The mapping unit 402 is configured to map a first-stage SCI on a PSCCH.

The transmitting unit 404 is configured to transmit the PSCCH and associated PSSCH.

Wherein, the first-stage SCI includes an indication information of a second-stage SCI for the associated PSSCH transmission that is mapped onto the associated PSSCH.

In embodiments of the present disclosure, the second-stage SCI is mapped to REs on DMRS for PSSCH symbols.

In embodiments of the present disclosure, the REs mapping of the second-stage SCI over the DMRS symbols is performed in frequency direction first, then time direction.

In embodiments of the present disclosure, REs on DMRS symbols not mapping the second-stage SCI are reused for mapping PSSCH data TB.

In embodiments of the present disclosure, the first-stage SCI includes a destination ID containing a broadcast identifier, a group identifier or a unicast identifier; when the destination ID contains the broadcast identifier, this indicates the second-stage SCI is not mapped onto the associated PSSCH and when the destination ID contains the group identifier or the unicast identifier, this indicates the second-stage SCI is mapped onto the associated PSSCH.

In embodiments of the present disclosure, the first-stage SCI further includes at least one of the following information: time location and/or duration of the associated PSSCH transmission; frequency location and/or size of the associated PSSCH transmission; PSSCH-DMRS pattern including location, number of symbols, or a pattern index; or size or aggregation level of the second-stage SCI.

In embodiments of the present disclosure, the second-stage SCI includes at least one of the following information: source identifier used to identify the transmitter terminal; or hybrid automatic response request (HARQ) identifier used to identify the exact HARQ process number.

In embodiments of the present disclosure, more than one slots are allocated for the associated PSSCH transmission.

In embodiments of the present disclosure, more than one PSSCH sub-channels in one slot are allocated for the associated PSSCH transmission.

Figure 11:
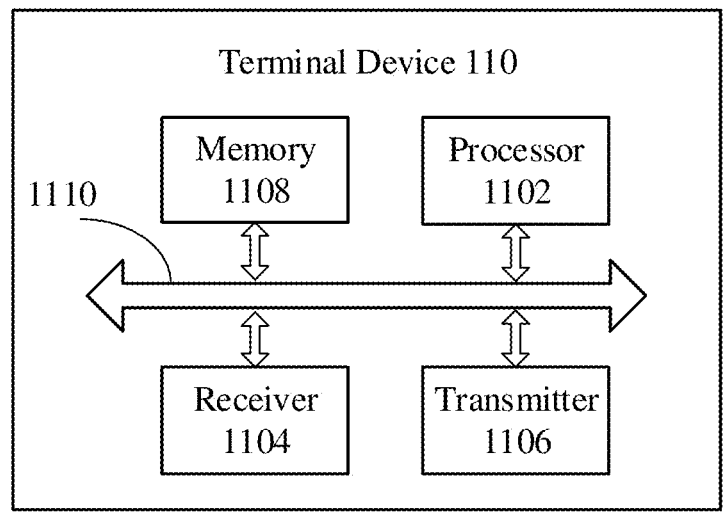
FIG. 11 schematically illustrates a terminal device according to an embodiment of the present disclosure.

It is important to note that, in the embodiment of the disclosure, the mapping unit 402 may be implemented by a processor (e.g. the processor 1102 in FIG. 11) and the transmitting unit 404 may be implemented by a transmitter (e.g. the transmitter 1106 in FIG. 11).

FIG. 11 schematically illustrates a terminal device according to an embodiment of the present disclosure.

As illustrated in FIG. 11, a terminal device 110 may include a processor 1102, a receiver 1104, a transmitter 1106 and a memory 1108, wherein the memory 1108 may be configured to store a code executed by the processor 1102 an the like.

Each component in the terminal device 110 is coupled together through a bus system 1110, wherein the bus system 1010 includes a data bus, and further includes a power bus, a control bus and a state signal bus.

The terminal 40 illustrated in FIG. 9 and the terminal device 110 illustrated in FIG. 11 may implement each process implanted by the first terminal 12 in the abovementioned method embodiments and will not be elaborated herein to avoid repetitions.

The processor 1102 typically controls overall operations of the terminal device 110, such as the operations associated with display, data communications and recording operations. The processor 1102 may include one or more processors to execute codes in the memory 1108. Optionally, when the codes are executed, the processor 1102 implements the method performed by the first terminal device 12 in the method embodiment, which will not be repeated here for brevity. Moreover, the processor 1102 may include one or more modules which facilitate the interaction between the processor 1102 and other components.

The memory 1108 is configured to store various types of data to support the operation of the terminal device 110. Examples of such data include instructions for any applications or methods operated on the terminal device 110, contact data, phonebook data, messages, pictures, video, etc. The memory 1008 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory or a magnetic or optical disk.

The receiver 1104 is configured to receive an electromagnetic signal received by the antenna. The main function of the receiver is to select the frequency components it needs from the numerous electromagnetic waves existing in the air, suppress or filter out unwanted signals or noise and interference signals, and then obtain the original useful information after amplification and demodulation.

The transmitter 1106 is configured to generate and modulate the RF current and transmit the radio waves through the antenna.

In embodiments of the present disclosure, the transmitter 1106 and receiver 1104 may be implemented as a transceiver.

Figure 10:
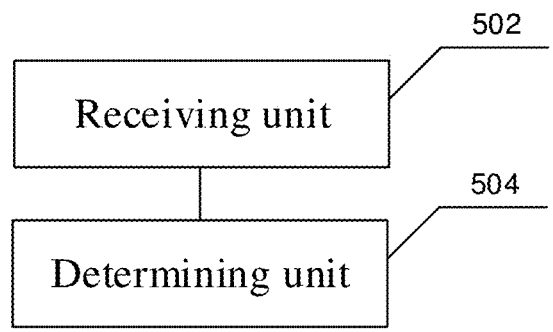
FIG. 10 schematically illustrates a terminal according to another embodiment of the present disclosure.

FIG. 10 schematically illustrates a terminal according to another embodiment of the present disclosure. The terminal may be the second terminal 13 in FIG. 6.

Referring to FIG. 10, the terminal 50 includes a receiving unit 502 and a determining unit 504.

The receiving unit 502 is configured to receive a first-stage SCI transmitted on a PSCCH.

The receiving unit 504 is configured to determine that a second-stage SCI transmitted on associated PSSCH is based on an indication information contained in the first-stage SCI.

Wherein, the second-stage SCI is used for the associated PSSCH reception.

In embodiments of the present disclosure, the second-stage SCI is mapped to REs on DMRS for PSSCH symbols.

In embodiments of the present disclosure, the REs mapping of the second-stage SCI over the DMRS symbols is performed in frequency direction first, then time direction.

In embodiments of the present disclosure, REs on DMRS symbols not mapping the second-stage SCI are reused for mapping PSSCH data TB.

In embodiments of the present disclosure, the first-stage SCI includes a destination ID containing a broadcast identifier, a group identifier or a unicast identifier; when the destination ID contains the broadcast identifier, this indicates the second-stage SCI is not mapped onto the associated PSSCH and when the destination ID contains the group identifier or the unicast identifier, this the second-stage SCI is mapped onto the associated PSSCH.

In embodiments of the present disclosure, the first-stage SCI further includes at least one of the following information: time location and/or duration of the associated PSSCH transmission; frequency location and/or size of the associated PSSCH transmission; PSSCH-DMRS pattern including location, number of symbols, or a pattern index; or size or aggregation level of the second-stage SCI.

In embodiments of the present disclosure, the second-stage SCI includes at least one of the following information: source identifier used to identify the transmitter terminal; or hybrid automatic response request (HARQ) identifier used to identify the exact HARQ process number.

In embodiments of the present disclosure, more than one slots are allocated for the associated PSSCH transmission.

In embodiments of the present disclosure, more than one PSSCH sub-channels in one slot are allocated for the associated PSSCH transmission.

It is important to note that, in the embodiment of the disclosure, the receiving unit 502 may be implemented by a receiver (e.g. the receiver 1204 in FIG. 12) and the determining unit 504 may be implemented by a processor (e.g. the processor 1202 in FIG. 14).

Figure 12:
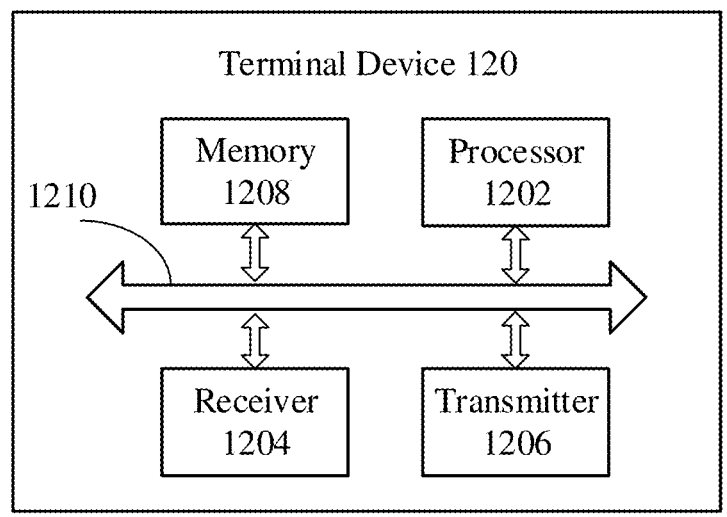
FIG. 12 schematically illustrates a terminal device according to another embodiment of the present disclosure.

FIG. 12 schematically illustrates a terminal device according to another embodiment of the present disclosure.

As illustrated in FIG. 12, a terminal device 120 may include a processor 1202, a receiver 1204, a transmitter 1206 and a memory 1208, wherein the memory 1208 may be configured to store a code executed by the processor 1202 an the like.

Each component in the terminal device 120 is coupled together through a bus system 1210, wherein the bus system 1210 includes a data bus, and further includes a power bus, a control bus and a state signal bus.

The processor 1202 typically controls overall operations of the terminal device 120, such as the operations associated with display, data communications and recording operations. The processor 1202 may include one or more processors to execute codes in the memory 1208. Optionally, when the codes are executed, the processor 1202 implements the method performed by the second terminal device 13 in the method embodiment, which will not be repeated here for brevity. Moreover, the processor 1202 may include one or more modules which facilitate the interaction between the processor 1202 and other components.

The memory 1208 is configured to store various types of data to support the operation of the terminal device 120. Examples of such data include instructions for any applications or methods operated on the terminal device 120, contact data, phonebook data, messages, pictures, video, etc. The memory 1008 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory or a magnetic or optical disk.

The receiver 1204 is configured to receive an electromagnetic signal received by the antenna. The main function of the receiver is to select the frequency components it needs from the numerous electromagnetic waves existing in the air, suppress or filter out unwanted signals or noise and interference signals, and then obtain the original useful information after amplification and demodulation.

The transmitter 1206 is configured to generate and modulate the RF current and transmit the radio waves through the antenna.

In embodiments of the present disclosure, the transmitter 1206 and receiver 1204 may be implemented as a transceiver.

The terminal 50 illustrated in FIG. 10 and the terminal device 120 illustrated in FIG. 12 may implement each process implanted by the second terminal 13 in the above-mentioned method embodiments and will not be elaborated herein to avoid repetitions.

Exemplary embodiments have been specifically shown and described as above. It will be appreciated by those skilled in the art that the disclosure is not limited the disclosed embodiments; rather, all suitable modifications and equivalent which come within the spirit and scope of the appended claims are intended to fall within the scope of the disclosure.

What is claimed is:

1. A method for data transmission, comprising:
    mapping, by a first terminal, a first-stage sidelink control information (SCI) onto a physical sidelink control channel (PSCCH); and
    transmitting, by the first terminal, the PSCCH and associated physical sidelink shared channel (PSSCH),
    wherein the first-stage SCI comprises an indication information of a second-stage SCI for the associated PSSCH transmission that is mapped onto the associated PSSCH;
    wherein the second-stage SCI is mapped to resource elements (REs) on a demodulation reference signal (DMRS) for PSSCH symbols;
    wherein REs on DMRS symbols not mapping the second-stage SCI are reused for mapping PSSCH data transport block (TB).

2. The method according to claim 1, wherein the first-stage SCI further comprises at least one of the following information:
    a time location or duration of the associated PSSCH transmission;
    a frequency location or size of the associated PSSCH transmission;
    a PSSCH-DMRS pattern comprising a location, a number of symbols, or a pattern index; or
    a size or aggregation level of the second-stage SCI.

3. The method according to claim 1, wherein the second-stage SCI comprises at least one of the following information:
    a source identifier used to identify a transmitter terminal; or
    a hybrid automatic response request (HARQ) identifier used to identify an exact HARQ process number.

4. The method according to claim 1, wherein the REs mapping of the second-stage SCI over the DMRS symbols is performed in frequency direction first, then time direction.

5. A terminal, comprising:
    a memory storing computer programs;
    a transceiver; and a processor,
wherein the processor is configured to execute the computer programs to:
map a first-stage SCI on a PSCCH; and
control the transceiver to transmit the PSCCH and an associated PSSCH,
wherein the first-stage SCI comprises indication information of a second-stage SCI for the associated PSSCH transmission that is mapped onto the associated PSSCH;
wherein the second-stage SCI is mapped to REs on a DMRS for PSSCH symbols;
wherein REs on DMRS symbols not mapping the second-stage SCI are reused for mapping PSSCH data transport block (TB).

6. The terminal according to claim 5, wherein the first-stage SCI further comprises at least one of the following information:
   a time location or duration of the associated PSSCH transmission;
   a frequency location or size of the associated PSSCH transmission;
   a PSSCH-DMRS pattern comprising a location, a number of symbols, or a pattern index; or
   a size or aggregation level of the second-stage SCI.

7. The terminal according to claim 5, wherein the second-stage SCI comprises at least one of the following information:
   a source identifier used to identify a transmitter terminal; or
   a hybrid automatic response request (HARQ) identifier used to identify an exact HARQ process number.

8. The terminal according to claim 5, wherein the REs mapping of the second-stage SCI over the DMRS symbols is performed in frequency direction first, then time direction.

9. A terminal, comprising:
a memory storing computer programs;
a transceiver; and
a processor,
wherein the processor is configured to execute the computer programs to:
control the transceiver to receive a first-stage SCI transmitted on a PSCCH; and
determine that a second-stage SCI transmitted on an associated PSSCH is based on indication information contained in the first-stage SCI,
wherein the second-stage SCI is used for associated PSSCH reception;
wherein the second-stage SCI is mapped to REs on a DMRS for PSSCH symbols;
wherein REs on DMRS symbols not mapping the second-stage SCI are reused for mapping PSSCH data transport block (TB).

10. The terminal according to claim 9, wherein the first-stage SCI further comprises at least one of the following information:
    a time location or duration of the associated PSSCH transmission;
    a frequency location or size of the associated PSSCH transmission;
    a PSSCH-DMRS pattern comprising a location, a number of symbols, or a pattern index; or
    a size or aggregation level of the second-stage SCI.

11. The terminal according to claim 9, wherein the second-stage SCI comprises at least one of the following information:
    a source identifier used to identify a transmitter terminal; or
    a hybrid automatic response request (HARQ) identifier used to identify an exact HARQ process number.

12. The terminal according to claim 9, wherein the REs mapping of the second-stage SCI over the DMRS symbols is performed in frequency direction first, then time direction.

* * * * *